US008549133B2

(12) United States Patent
Vaver

(10) Patent No.: US 8,549,133 B2
(45) Date of Patent: Oct. 1, 2013

(54) SYSTEMS AND METHODS FOR TRACKING THE RELIABILITY OF COMMUNICATIONS NETWORKS

(75) Inventor: Jon G. Vaver, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 2075 days.

(21) Appl. No.: 10/096,024

(22) Filed: Mar. 11, 2002

(65) Prior Publication Data

US 2003/0172153 A1 Sep. 11, 2003

(51) Int. Cl.
*G06F 15/173* (2006.01)

(52) U.S. Cl.
USPC .......... 709/224

(58) Field of Classification Search
USPC .......... 715/736, 36; 709/200, 227, 223–226, 709/246, 230–237, 238–244; 370/227, 252
See application file for complete search history.

(56) References Cited

U.S. PATENT DOCUMENTS 4,578,773 A 3/1986 Desai et al.
4,970,726 A 11/1990 Carn et al.
5,400,343 A * 3/1995 Crittenden et al. .......... 714/721
5,539,652 A * 7/1996 Tegethoff .......... 703/14
5,886,905 A * 3/1999 Yokozawa .......... 703/14
6,092,096 A * 7/2000 Lewis .......... 709/200
6,148,335 A 11/2000 Haggard et al.
6,363,477 B1 * 3/2002 Fletcher et al. .......... 713/151
6,377,543 B1 * 4/2002 Grover et al. .......... 370/227
6,462,684 B1 * 10/2002 Medelius et al. .......... 341/120
6,651,192 B1 * 11/2003 Viglione et al. .......... 714/47
6,661,778 B1 * 12/2003 Trofin et al. .......... 370/252
6,675,129 B1 * 1/2004 Cambon et al. .......... 702/182
6,684,247 B1 * 1/2004 Santos et al. .......... 709/224
6,684,349 B2 * 1/2004 Gullo et al. .......... 714/47.2
6,691,165 B1 * 2/2004 Bruck et al. .......... 709/227
6,711,137 B1 * 3/2004 Klassen et al. .......... 370/252
6,738,931 B1 * 5/2004 Osborn et al. .......... 714/37
6,847,608 B1 * 1/2005 Soo et al. .......... 370/228
6,853,388 B2 * 2/2005 Ueno et al. .......... 715/736
6,862,288 B2 * 3/2005 Valoth et al. .......... 370/403
6,868,428 B2 3/2005 Todokoro et al.
6,892,317 B1 * 5/2005 Sampath et al. .......... 714/4.3
6,959,126 B1 * 10/2005 Lofland et al. .......... 385/16
(Continued)

OTHER PUBLICATIONS

Park et al., Model-based Path Planning and Tracking Control using Neural Networks for a Robot Manipulator, Neural Networks, 1997, International Conference on vol. 3, Jun. 9-12, 1997, pp. 1761-1765.*

(Continued)

*Primary Examiner* — Imad Hussain
(74) *Attorney, Agent, or Firm* — Swanson & Bratschun, L.L.C.

(57) ABSTRACT

A system for monitoring the reliability of a network includes a network management system that gathers information relating to modules, nodes and paths in the network. The information includes the configuration, history and status of the modules and paths, and the failure states of the paths and the modules responsible for any failed paths. Based on the information, a reliability monitoring tool produces output that includes the condition of network paths and the actual reliability of one or more paths. Embodiments of the invention include storage arrangements that store the module and path information, in which case the output may include time-based reliability of network paths. The output may be available via the Internet. Methods of monitoring the reliability of a network are also provided.

13 Claims, 4 Drawing Sheets

| Reference Character | Item |
|---|---|
| 300 | segment |
| 302 | Reliability Monitoring System |
| 304 | Path |
| 306-312 | Modules |

(56) References Cited

U.S. PATENT DOCUMENTS

| | | | | |
|---|---|---|---|---|
| 6,973,491 | B1 | 12/2005 | Staveley et al. | |
| 6,980,959 | B1 * | 12/2005 | Garrow et al. | 705/7.21 |
| 7,058,542 | B2 | 6/2006 | Hauhia et al. | |
| 7,222,174 | B2 * | 5/2007 | Kumano et al. | 709/224 |
| 7,523,192 | B2 | 4/2009 | Vaver | |
| 7,870,243 | B1 * | 1/2011 | Aikens et al. | 709/224 |
| 2001/0052087 | A1 | 12/2001 | Garg et al. | |
| 2002/0194160 | A1 * | 12/2002 | Garrow et al. | 707/2 |
| 2003/0110426 | A1 | 6/2003 | Faust et al. | |
| 2003/0154262 | A1 | 8/2003 | Kaiser et al. | |
| 2004/0181712 | A1 * | 9/2004 | Taniguchi et al. | 714/47 |
| 2004/0254764 | A1 * | 12/2004 | Wetzer et al. | 702/184 |
| 2005/0004821 | A1 * | 1/2005 | Garrow et al. | 705/7 |
| 2006/0265261 | A1 * | 11/2006 | Wetzer et al. | 705/7 |
| 2009/0113049 | A1 * | 4/2009 | Nasle et al. | 709/224 |
| 2009/0125277 | A1 * | 5/2009 | Wetzer et al. | 702/184 |
| 2010/0149993 | A1 * | 6/2010 | Kakadia et al. | 370/242 |

OTHER PUBLICATIONS

Jones, Jeff et al. "A Comparison of Electronic-Reliability Prediction Models". IEEE Transactions on Reliability. vol. 48. No. 2. Jun. 1999. pp. 1-8 (127-134).*

U.S. Appl. No. 10/095,415, Issue Notification dated Apr. 1, 2009, 1 pg.

U.S. Appl. No. 10/095,415, Notice of Allowance dated Feb. 13, 2009, 8 pgs.

U.S. Appl. No. 10/095,415, Office Action dated Sep. 5, 2008, 9 pgs.

U.S. Appl. No. 10/095,415, Office Action dated Mar. 17, 2008, 9 pgs.

U.S. Appl. No. 10/095,415, Advisory Action dated Oct. 23, 2007, 4 pgs.

U.S. Appl. No. 10/095,415, Final Office Action dated Aug. 14, 2007, 11 pgs.

U.S. Appl. No. 10/095,415, Office Action dated Mar. 14, 2007, 11 pgs.

* cited by examiner

Legend

| Reference Character | Item |
|---|---|
| 102 | Links |
| A, B, C, D | Nodes |

Legend

| Reference Character | Item |
| --- | --- |
| 300 | segment |
| 302 | Reliability Monitoring System |
| 304 | Path |
| 306-312 | Modules |

SYSTEMS AND METHODS FOR TRACKING THE RELIABILITY OF COMMUNICATIONS NETWORKS

CROSS-REFERENCE TO RELATED APPLICATIONS

This application is related to the following commonly assigned and concurrently filed patent application:

U.S. patent application Ser. No. 10/095,415, entitled "Automated Module Tracking System for Communications Networks," by Jon G. Vaver.

BACKGROUND OF THE INVENTION

The present invention relates generally to systems for tracking the reliability of electronic networks. More specifically, the present invention relates to systems and methods for providing real-time and historical reliability performance statistics for communication networks by tracking the status and service history of modules, nodes and paths in the network.

Computer and telecommunication networks are ubiquitous in modern society. From emails within a small office to international telephone calls, nearly every form of electronic communication depends on some form of electronic network. With the dependence comes a need for greater reliability.

Electronic networks include many components or modules that in one way or another facilitate the transmission of electronic signals along paths through the network. Thus, the reliability of the network is a function of the reliability of the individual network modules. Manufactures provide predictive reliability information for the modules. The predicted reliability of network paths can be calculated based on the manufacturer-provided reliability information for the modules. However, the actual reliability of network paths and modules may vary substantially from the predicted reliability. Therefore, to provide progressively more accurate network reliability information, systems are needed that more comprehensively gather and analyze data associated with network modules and paths.

Among other things, the present invention provides systems and methods that monitor the status and service history of network modules, nodes and paths. Furthermore, the present invention provides the capability to make the information available real-time via a web-based tool.

BRIEF SUMMARY OF THE INVENTION

The present invention provides methods for monitoring the reliability of electronic networks. The monitoring results may be made available over a communications network such as the Internet. The system is capable of comparing measured reliability to reliability predictions based on manufacturer's data. The system is capable of monitoring many different types of networks and tremendously improves upon the capabilities of existing network management systems. The system may be implemented using a computing system as simple as a personal computer. However, it is equally possible that the system may be implemented using a number of different computers distributed across a large geographic region connected together by a network, which may be the network the system is monitoring.

In one embodiment the system monitors a network having a plurality of nodes interconnected by links. Each node includes a plurality of modules, and the modules cooperate to transport signals along paths from origins to destinations on the network. The system for monitoring the reliability of the network includes a network management system that gathers information, including the configuration, history and status of paths on and modules in the network. The information further includes data associated with failed paths and modules responsible for the failed paths. The system also includes a reliability monitoring tool that receives the information and produces output representing the condition of paths on the network and actual reliability data associated with at least one path.

In another embodiment of the system, the system also includes at least one data storage arrangement configured to receive and store the information. The reliability monitoring tool produces output representing the reliability performance of at least one network path as measured over a period of time. The reliability monitoring tool may compare the information with predicted reliability performance data and produce output relating to the comparison. The output may be made available over the Internet.

In another embodiment the system monitors a network having a plurality of nodes interconnected by links. Each node includes a plurality of modules, and the modules may be combined into assemblies or separated into components. The modules, assemblies and components cooperate to transport signals along paths from origins to destinations on the network. The system for monitoring the reliability of the network includes a network management system that gathers information, including the configuration, history and status of paths on and modules in the network. The information includes data associated with failed paths and modules responsible for the failed paths. The system also includes a module and node storage arrangement that receives and stores the information relating to the modules in the network. The system further includes a path service storage arrangement that receives and stores the information relating to the paths in the network. The system incudes a reliability prediction storage arrangement that receives and stores product information, relating to the modules, assemblies and components in the network. The product information includes availability and reliability prediction information. The system also includes a reliability monitoring tool that receives the module, path and product information and produces output representing the condition of paths on the network and the actual reliability of at least one path. In a related embodiment, the system also includes the modules, nodes and links that comprise the network.

The present invention also provides a method of monitoring the reliability of a network. The network includes a plurality of nodes interconnected by links, and each node includes a plurality of modules. The modules cooperate to transport signals along paths from origins to destinations on the network. The method includes gathering information relating to paths on and modules in the network. The information includes the configuration, history and status of paths and modules, and the failure state of paths and the modules responsible for the failed paths. The method further includes producing output representing the condition of paths on the network and the actual reliability of at least one path. In a related embodiment, the method also includes receiving and storing the information and producing output representing the reliability performance of at least one network path as measured over a period of time. The method may include comparing the information with predicted reliability performance data and producing output relating to the comparison. The information may be made available over the Internet.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
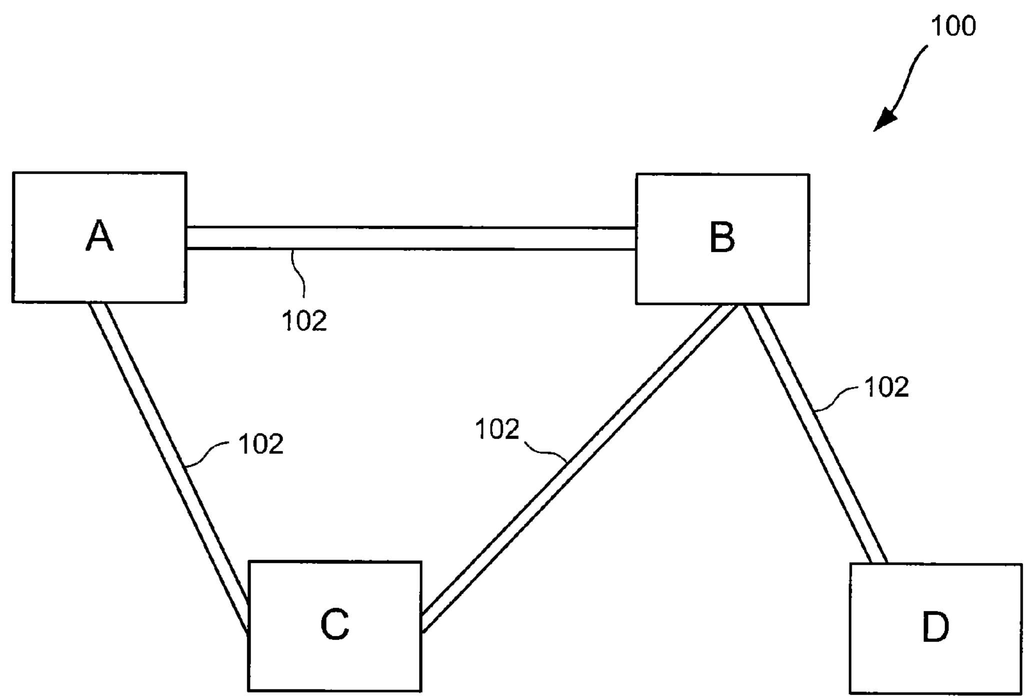
FIG. 1 illustrates an embodiment of a network in accordance with the present invention, which may include reliability measurements that may be monitored according to the present invention.

The present invention provides systems and methods for gathering and analyzing data relating to the status and service history of modules, nodes and paths in an electronic network. The present invention then uses this data to compute reliability performance statistics and makes the information available through a web-based system.

Electronic networks are well known. The Internet is one example of an electronic network. Other examples include local area networks (LANs), wide area networks (WANs), long-haul transmission networks and the like, all of which may benefit from the present invention.

Networks consist of a collection of nodes interconnected by transmission links, and herein may be entire networks or portions of larger networks. The transmission links may be any means for transmitting signals, including fiber optic cable, copper wiring, microwave signals, satellite up- and down-links and the like. Networks also include relay stations along transmission links for receiving and retransmitting signals, in order to, for example, increase the signal's strength. Signals are the impulses, electrical, optical, or other, that represent the content of the transmission. Signals may be analog, digital, or a combination of the two. At network nodes, signals may be added to the network. Such signals may be new signals or signals transferred from other networks. Signals may also be removed from the network if the node is the signal's destination. Signals may also be redirected to other networks for further routing to their destinations. Along transmission links, signals may be monitored for any number of reasons, such as to monitor the status of the network.

Signals follow "paths" through the network. A path is a route from an origin to a destination. The same physical route may include many paths, since separate signals may occupy different wavelengths along the route.

At nodes, relay stations and monitoring sites, many components, or modules, cooperate to perform various network functions. According to embodiments of the present invention, modules include any electronic equipment responsible for a function associated with the network. In other embodiments, modules include individual replaceable units of electronic equipment. For example, modules may include power supplies, transmitters, receivers, relays, splitters, tuners, amplifiers, pumps, filters, multiplexers, gain equalizers, dispersion equalizers, CPUs, shelf/control processors, and the like. Many other module types are possible and may have vendor-specific functional names. Modules may be separated into smaller components or combined into assemblies Networks are only useful when they function properly. "Reliability" generally refers to the frequency with which a network fulfills its intended function of successfully transporting a signal from an origin to a destination on the network. Because networks often carry important signals, reliability is a key network factor, along with such factors as cost of operation, customer trust, and revenue generation.

Typically, only the smallest of networks are dedicated to single users. Networks are often owned by large telecommunications companies, and paths—or wavelengths—are leased or sold to individual users. Users expect that their paths will be available when they want them. Thus, network owners are pressured to provide highly reliable services to their users. Further, even large, single-user-dedicated networks require high reliability. After all, if a single user is willing to incur the expense of creating and maintaining a dedicated network, the user likely intends for the network to be highly reliable. In short, reliability is important to both owners and users of networks.

The reliability of any system is a function of the reliability of individual components of the system. Networks are no different. Whether a network path is considered reliable depends on the transmitters, receivers, relays, power supplies and other modules that cooperate to transmit a signal through the network. Thus, network owners, operators and users desire highly reliable network modules.

Manufacturers of network components provide product information that includes predicted reliability performance data for the components, from which predicted reliability for the network may be calculated. However, the actual reliability of paths and modules may depart significantly from that predicted. As a result, network owners may be over promising or under advertising the reliability of their network.

The science of reliability is well known. In general, future reliability predictions may be based on past experience. Thus, in order to provide highly accurate reliability information to those interested in reliability, as much data as reasonably possible needs to be collected and maintained. Generally, the more important the network, the more data should be collected for reliability assessment purposes.

According to the present invention, a network management system monitors the functions and state of a network. The system specifies identification numbers for modules, nodes and paths through the network and sends the information to various databases for organized storage. The network monitoring system documents the modules that enable each path to function and associates this information in a database. Periodically, the network monitoring system may test each path and/or module for proper operation. Alternatively or additionally, rather than explicitly testing the paths and/or modules, the network monitoring system may monitor the modules and paths indirectly as the network monitoring system performs other functions. The results, including the cause of any malfunctions, are stored. Other relevant network information is also collected by the network monitoring system.

A number of data storage arrangements maintain the information collected according to the present invention. For example, a module and node database, or module and node storage arrangement, collects and stores portions of the network information relating to the modules and nodes. A wavelength/path database, or path service storage arrangement, stores portions of the network information relating to the network paths. A reliability prediction database, or reliability prediction storage arrangement, stores product information, including data relating to the predicted reliability performance of network modules and other components, such as software. The predicted reliability performance data may come from the manufacturers of the modules. The data storage arrangements may be, for example, databases or many other well known arrangements for storing data. It is not necessary for the databases to exist as individual units.

A reliability monitoring tool interacts with the stored data in response to user-specified requests or programmed tasks. The tool uses the data to calculate or present a number of reliability-related statistics. The tool can provide real-time measured reliability for paths, modules and even the network as a whole. It can compare measured to predicted reliability. The tool can predict the reliability of new paths prior to initiation based on the type of modules that will enable the path and the reliability of specific modules for which data has been collected. Many other calculations are possible.

The reliability monitoring tool may be, for example, a statistical software package residing on a personal computer or workstation. In may also be a web-based tool that provides information to users over the Internet or other network in response to user commands. It can provide output in the form of printed reports, screen displays and the like. Many other possibilities are apparent to those skilled in the art in light of this disclosure.

Having described the present invention generally, a more specific description will be provided herein with reference to the included figures. Attention is directed to FIG. 1, which illustrates a network 100 according to the present invention. The network 100 may be the Internet, a LAN, a WAN or any other network arrangement configured to transport signals from one point on the network to another. The network 100 includes transmission links 102 that actually carry the signals, and nodes A, B, C and D at which signals may be originated, terminated, relayed or redirected. The transmission links 102 may include copper wire, fiber optic cable, microwave signals, satellite links or the like.

Figure 2:
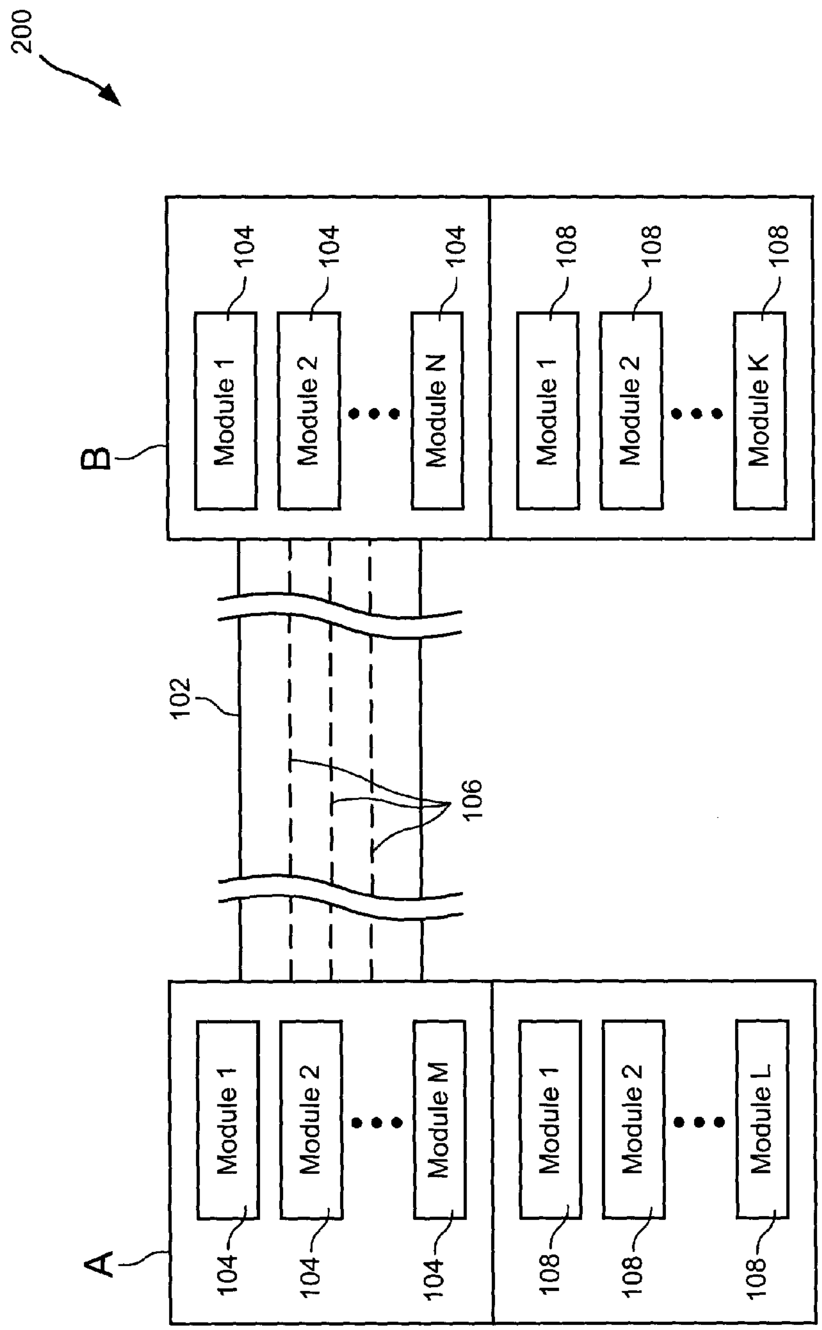
FIG. 2 illustrates a more detailed view of a portion of the network of FIG. 1.

FIG. 2 illustrates a segment 200 of the network 100 in greater detail. The segment 200 includes nodes A and B and a transmission link 102. Each of nodes A and B includes a plurality of modules 104. The modules 104 may be transmitters, receivers, power supplies, controllers, relays and the like. The modules 104 enable signals to travel along a portion of a path 106 through the network 100. Signals do not necessarily travel through the modules 104. Nodes A and B also include module slots 108. Modules slots are receptacles into which modules are inserted to activate paths. Node B has N module slots. Not all of these slots must be populated with modules in order for node B to carry traffic. However, a subset of module slots in node B must be populated with properly functioning modules in order for a particular path from node A to B to exist (and similarly for node A, which has M module slots). Thus, this collection of modules 104 in nodes A and B may be associated with the path 106 from node A to node B.

Figure 3:
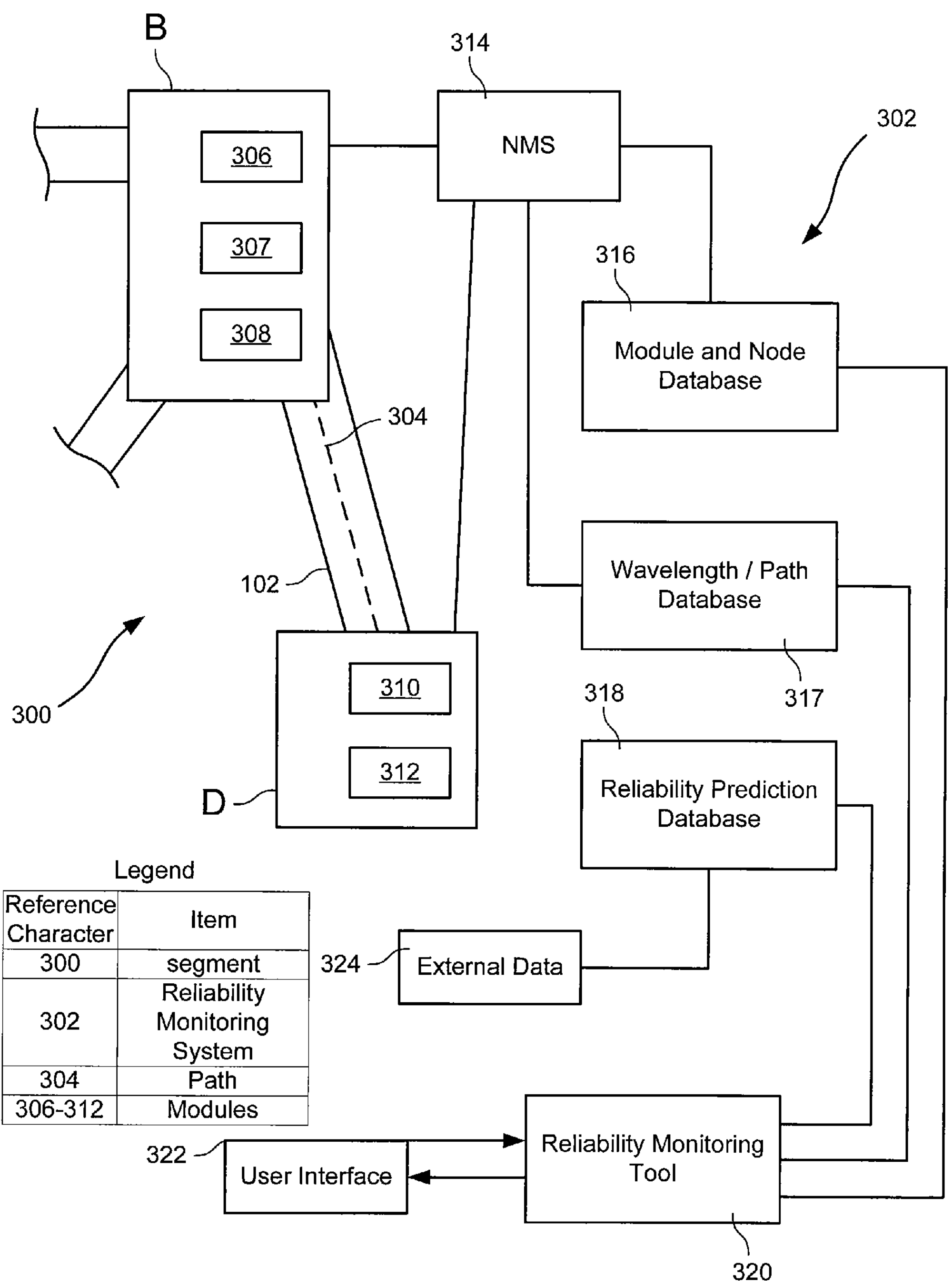
FIG. 3 illustrates an embodiment of a system for tracking the reliability of a network according to the present invention.

FIG. 3 illustrates a segment 300 of the network 100 in combination with a reliability monitoring system 302 according to the present invention. The segment 300 includes nodes B and D and transmission link 102. A portion of a path 304 traverses the link 102. Modules 306, 307 and 308 in node B and 310 and 312 in node D enable the path 304 to operate, at least through this segment 300. It should be noted that a module may be associated with more than one path.

The system 302 includes a network management system 314, a module and node database 316, a wavelength/path database 317, a reliability prediction database 318 and a reliability monitoring tool 320. The system 302 also includes a user interface 322. The network management system 314 performs a number of network functions well known to those skilled in the art. In addition to the well known functions, the network management system 314 also performs a number of additional functions according to the present invention, as will be explained in more detail hereinafter. The module and node database 316, the wavelength/path database 317, and the reliability prediction database 318 may be any of a number of well known data storage arrangements or equivalents. For example, the databases 316, 317, 318 may be magnetic disk drives, optical drives, solid state memory or the like. The reliability monitoring tool 320 may be, for example, a software, hardware or firmware program on a personal computer, mainframe, workstation or the like. The user interface 322 may be, for example, a monitor and keyboard, printer and the like. The user interface 322 may include a connection via the Internet or other network. Although the components of the system 302 are illustrated as distinct components, this is not necessarily the case. The system components may reside together on a single computer or be separated from one another via a network.

The network management system 314 interfaces to the nodes in the network 100, as shown. In other embodiments, connections to some nodes may be through other nodes. As stated previously, the network management system 314 performs a number of well known functions, such as, for example path/link initialization, path termination, traffic management, and monitoring and alarming at the module, node, and system level. In addition, the network management system 314 performs a number of additional functions according to the present invention. For example, the network management system 314 tests and/or monitors individual paths through the network and identifies paths that are not operating properly. It also records a history of path status for each path through the network. History updates may take place at various frequencies, for example from sub-minute frequencies to daily, hourly or even weekly, or as desired. It also identifies malfunctioning modules in the network, a task that may be carried out according to the teachings of copending, concurrently filed and commonly assigned U.S. patent application Ser. No. 10/095,415 entitled "Automated Module Tracking System for Communications Networks," by Jon G. Vaver, which application is incorporated herein by reference in its entirety. The network management system 314 also tracks the amount of time a path or module is out of service, which may be accomplished, for example, by recording when the path went out of service and when the path returned to service. It also obtains and tracks additional status information about each node, module and path in the network.

The network management system 314 also causes certain node, module, and module slot information to be sent to the module and node database 316. The information includes: identification numbers for modules, nodes and module slots in the network; status, which includes populated, unpopulated, up, down, and partially functional (perhaps with a description or code to indicate the nature of the partial outage);the location (node) of each module; the time each module began service; and other service history information relating to the modules such as, for example, the time, cause and duration of any service failures relating to the modules and the success of protection coverage. The module and node database 216 stores the information and provides the information in response to requests from other parts of the system, as will be described hereinafter.

The network management system 314 also causes certain network information to be sent to the wavelength/path database 317. The information includes: identification numbers for paths that traverse or have traversed the network; initiation data of the path; termination data of the path; nodes each path relies on; modules each path relies on; and service history information relating to the paths, such as, for example, the time, cause and duration of path failures, and the success of protection coverage. The wavelength/path database 317 stores the information and provides the information in response to requests from other parts of the system, as will be described hereinafter.

The reliability prediction database 318 stores information, including availability and reliability predictions for each type of module and each type of software system in the network. The reliability prediction database receives the information from external sources 324, and provides the information in response to user requests from other parts of the system.

The reliability monitoring tool 320 interacts with the module and node database 316, the wavelength/path database 317 and the reliability prediction database 318 to perform a number of functions. For example, for network paths, the tool calculates and/or presents: availability, reliability, maintainability, downtime analysis, predicted availability based on the manufacturers' data for modules supporting the path, and predicted availability based on the actual performance of the modules supporting the path. Similar calculations may be accomplished for paths prior to initiation. For the network, the tool may calculate and/or present, for example: availability, reliability, maintainability, and downtime analysis. For network modules, the tool may calculate and/or present, for example: availability, reliability, maintainability, downtime analysis and a comparison between predicted and measured availability and reliability. Other calculations are possible and are apparent, in light of this disclosure, to those skilled in the art.

Availability is the probability that a component or system is performing its required function at a given point in time. Availability calculations are simply performed by adding up the amount of time that a module, node, or path was performing its required function and dividing it by the amount of time that it should have been performing its required function (e.g., the time period between initial module population and the present time).

Reliability is the probability that a component or system will perform a required function for a given period of time. Reliability calculations are performed by generating a probability distribution of uninterrupted "up" times for a module, node, or path (i.e., a distribution times between failures). This distribution provides the means for doing the simple probability calculation (e.g., the number of times that modules of type X were in service for more than 1 month since first being introduced/reintroduced into service divided by the number of modules of type X that were introduced/reintroduced into service.)

Maintainability is the probability that a failed component or system will be restored or repaired to a specified condition within a period of time. Maintainability calculations are performed in the same way as reliability calculations, except that the quantities of interest are the lengths of time in which modules, nodes, or paths are out of service.

Downtime analysis is performed by categorizing module, node, or path downtime according to the root cause of failure. For example, think of a pie chart showing the percentage of overall path downtime caused by failure in each of the various types of modules. Or for paths from node A to B, a chart showing the percentage of downtime caused by hardware failures versus software failures. These are only two of many possible scenarios.

In embodiments of the present invention, the reliability monitoring tool 320 is configured to respond to user commands to present the information in any number of ways. For example, the information may be made available via the Internet to users with sufficient access privilege. The information may be displayed on a computer monitor, or the like, or printed in the form of reports. Many other equivalents are possible.

Figure 4:
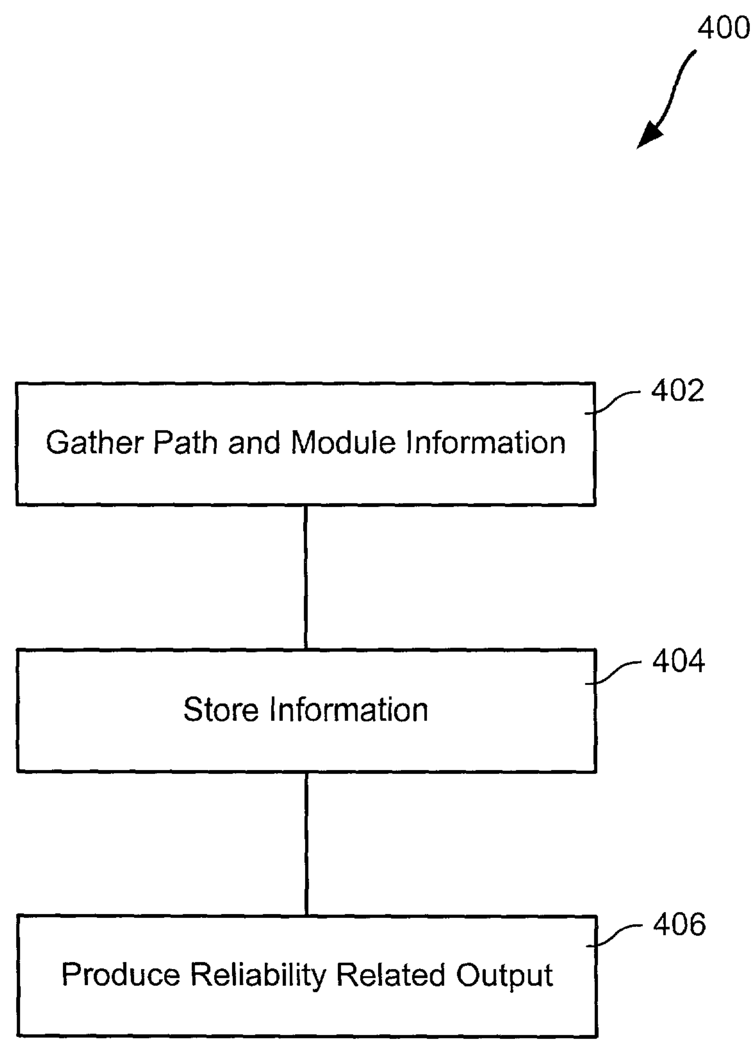
FIG. 4 illustrates another embodiment of a method of tracking the reliability of a network according to the present invention.

FIG. 4 illustrates a method for monitoring the reliability of networks. At operation 402, network information relating to the paths on and modules in the network is gathered. The network information includes, for example, the configuration, history and status of paths and modules. The network information may also include the failure state of paths and the modules responsible for the failed paths. At operation 404, the network information may be stored for later comparison or trend analysis purposes. At operation 406, results are produced that represent the condition of paths on the network and the actual reliability of one or more network paths. The output may include a time-based comparison of the reliability to predicted reliability. The method may include making the information available over the Internet.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for monitoring the reliability of a network, wherein the network includes a plurality of nodes interconnected by links, wherein each node includes a plurality of modules, and wherein the modules cooperate to transport signals along paths from origins to destinations on the network, the system, comprising:

a network management system comprising a computer system executing software that gathers network information by periodically testing individual paths through the network and identifying paths that are not operating properly, wherein the network information includes the configuration, history and status of paths on and modules in the network, wherein the network information further includes data associated with failed paths and modules responsible for the failed paths; and a reliability monitoring tool configured to:

receive the network information;

determine an actual reliability for at least a portion of the network;

produce output representing the condition of paths on the network and actual reliability data associated with at least one path;

receive predicted reliability performance data for one or more modules associated with a path, wherein the predicted reliability performance data are based on manufacture-supplied reliability predictions for the one or more modules;

determine a predicted reliability based on manufacture-supplied reliability predictions for at least a portion of the network from the predicted reliability performance data of the one or more modules;

compare the actual reliability with the predicted reliability based on manufacture-supplied reliability predictions; and produce output relating to the comparison.

2. The system as recited in claim 1, further comprising at least one data storage arrangement configured to receive and store the network information, wherein the reliability monitoring tool determines a reliability performance of at least one network path as measured over a period of time and produces output representing the reliability performance.

3. The system as recited in claim 1, wherein the output is made available over the Internet.

4. The system as recited in claim 1, wherein the output is made available over a private network.

5. A system for monitoring the reliability of a network, wherein the network includes a plurality of nodes interconnected by links, wherein each node includes a plurality of modules, wherein the modules may be combined into assemblies or separated into components, and wherein the modules, assemblies and components cooperate to transport signals along paths from origins to destinations on the network, the system, comprising:

a network management system comprising a computer system executing software that gathers network information by periodically testing individual paths through the network and identifying paths that are not operating properly, wherein the network information includes the configuration, history and status of paths on and modules in the network, wherein the network information includes data associated with failed paths and modules responsible for the failed paths;

a module and node storage arrangement that receives and stores a first portion of the network information relating to the modules in the network;

a path service storage arrangement that receives and stores a second portion of the network information relating to the paths in the network;

a reliability prediction storage arrangement that receives and stores product information relating to the modules, assemblies and components in the network, the product information including availability and reliability prediction information; and a reliability monitoring tool configured to:

receive the network information;

determine an actual reliability for at least a portion of the network;

produce output representing the condition of paths on the network and actual reliability data associated with at least one path;

receive predicted reliability performance data for one or more modules associated with a path, wherein the predicted reliability performance data are based on manufacture-supplied reliability predictions for the one or more modules;

determine a predicted reliability based on manufacture-supplied reliability predictions for at least a portion of the network from the predicted reliability performance data of the one or more modules;

compare the actual reliability with the predicted reliability based on manufacture-supplied reliability predictions; and produce output relating to the comparison.

6. The system as recited in claim 5, further comprising the modules, nodes and links in the network.

7. The system as recited in claim 5, wherein the output is made available over the Internet.

8. The system as recited in claim 5, wherein the output is made available over a private network.

9. The system as recited in claim 5, wherein the reliability monitoring tool determines a reliability performance of at least one network path as measured over a period of time and produces output representing the reliability performance.

10. A method of monitoring the reliability of a network, wherein the network includes a plurality of nodes interconnected by links, wherein each node includes a plurality of modules, and wherein the modules cooperate to transport signals along paths from origins to destinations on the network, the method, comprising:

periodically testing individual paths through the network and identifying paths that are not operating properly to gather network information relating to paths on and modules in the network, the network information, including the configuration, history and status of paths and modules, and the failure state of paths and the modules responsible for the failed paths;

determining an actual reliability of at least a portion of the network; and producing output representing the condition of paths on the network and the actual reliability of at least one path;

receiving predicted reliability performance data for one or more modules associated with a path, wherein the predicted reliability performance data are based on manufacture-supplied reliability predictions for the one or more modules;

determining a predicted reliability based on manufacture-supplied reliability predictions for at least a portion of the network from the predicted reliability performance data of the one or more modules;

comparing the actual reliability with the predicted reliability based on manufacture-supplied reliability predictions; and producing output relating to the comparison.

11. The method as recited in claim 10, further comprising:

receiving and storing the network information; and determining a reliability performance of at least one network path as measured over a period of time.

12. The method as recited in claim 10, further comprising making the output available over the Internet.

13. The method as recited in claim 10, further comprising making the output available over a private network.

* * * * *